(12) United States Patent
Bangfei et al.

(10) Patent No.: US 8,539,128 B1
(45) Date of Patent: Sep. 17, 2013

(54) ARCHITECTURE FOR AN EFFICIENT MEDIA FRAMEWORK

(75) Inventors: Jin Bangfei, Shanghai (CN); Chin-Yee Lin, Los Gatos, CA (US)

(73) Assignee: VisualOn, Inc., Santa Clara, CA (US)

( * ) Notice: Subject to any disclaimer, the term of this patent is extended or adjusted under 35 U.S.C. 154(b) by 249 days.

(21) Appl. No.: 12/970,257

(22) Filed: Dec. 16, 2010

(51) Int. Cl.
*G06F 13/42* (2006.01)
*G06T 13/00* (2011.01)

(52) U.S. Cl.
USPC .......................................... 710/105; 345/473

(58) Field of Classification Search
USPC .......................................... 710/105; 345/473
See application file for complete search history.

(56) References Cited

U.S. PATENT DOCUMENTS

| | | | |
|---|---|---|---|
| 2008/0010392 A1* | 1/2008 | Melpignano | 710/117 |
| 2008/0134012 A1* | 6/2008 | Kokes et al. | 715/201 |
| 2009/0164655 A1* | 6/2009 | Pettersson et al. | 709/231 |
| 2011/0047255 A1* | 2/2011 | Yoshikawa | 709/223 |
| 2011/0197202 A1* | 8/2011 | Lodolo | 719/313 |
| 2012/0117472 A1* | 5/2012 | Su | 715/719 |
| 2012/0291052 A1* | 11/2012 | Choi et al. | 719/320 |

OTHER PUBLICATIONS

Khronos Group, Openmax Integration Layer Application Programming Interface Specification Version 1.0, 2005.*

* cited by examiner

*Primary Examiner* — Paul R Myers
*Assistant Examiner* — Christopher A Daley
(74) *Attorney, Agent, or Firm* — Van Pelt, Yi & James LLP

(57) ABSTRACT

A system comprises a first media framework component, a second media framework component, and a media framework. The media framework comprises a simplified media framework interface and a non-tunnel mode handler. The simplified media framework interface handles connectivity between a first port and a second port in a tunnel mode. The non-tunnel mode handler converts connectivity of a third port and a fourth port in a non-tunnel mode to appear to be the tunnel mode for the simplified media framework interface. The first port and the second port of the simplified media framework interface is coupled to a fifth port and a sixth port of the non-tunnel mode handler. And, the third port of the non-tunnel mode handler is coupled to the first media framework component and the fourth port of the non-tunnel mode handler is coupled to the second media framework component.

20 Claims, 17 Drawing Sheets

ARCHITECTURE FOR AN EFFICIENT MEDIA FRAMEWORK

BACKGROUND OF THE INVENTION

Processing and rendering media (e.g., audio or video) is a very popular application on computers, cellular phones, and embedded computing devices. Many different software applications exist to perform the media processing and rendering, some specific to one type of computing device, some which exist on multiple platforms. Underlying the software is typically a media framework application programming interface (API), which provides access to the media capabilities of the computing device. A media framework additionally has an associated set of functionality that may be used with the framework to build new media applications, referred to variously as components or plug-ins. These components may be authored by the framework authors and included along with the framework, or they may be authored by a third party and distributed separately. There exist several media frameworks, e.g., DirectShow, OpenMAX, GStreamer, QuickTime, Helix DNA, Xine, etc. Some of these media frameworks (e.g., DirectShow, QuickTime) are authored by a software company and distributed as closed-source software. Some of the media frameworks (e.g., OpenMAX) have functionality specified by a central organization, but implementation of the functionality left to outside developers, for distribution as either open or closed-source software.

Many software components exist for the OpenMAX framework, and many can be used together to form a single application. OpenMAX components forming an application communicate both with OpenMAX framework and with each other. Communication between OpenMAX components can be directly from one component to the next, referred to as communication in tunnel mode, or it can pass through and be controlled by the OpenMAX framework, referred to as communication in non-tunnel mode. Some OpenMAX components support communication in either tunnel mode or non-tunnel mode, and some OpenMAX components support communication only in non-tunnel mode. Controlling and keeping track of non-tunnel mode communications can be significant overhead for OpenMAX framework, but is necessary to support communications involving components that do not implement tunnel mode communication. Building a non-tunnel mode communication handler that is efficient even when there is a large, complex network of components can be significant work for the software developer implementing OpenMAX framework.

BRIEF DESCRIPTION OF THE DRAWINGS

Various embodiments of the invention are disclosed in the following detailed description and the accompanying drawings.

DETAILED DESCRIPTION

Figure 1:
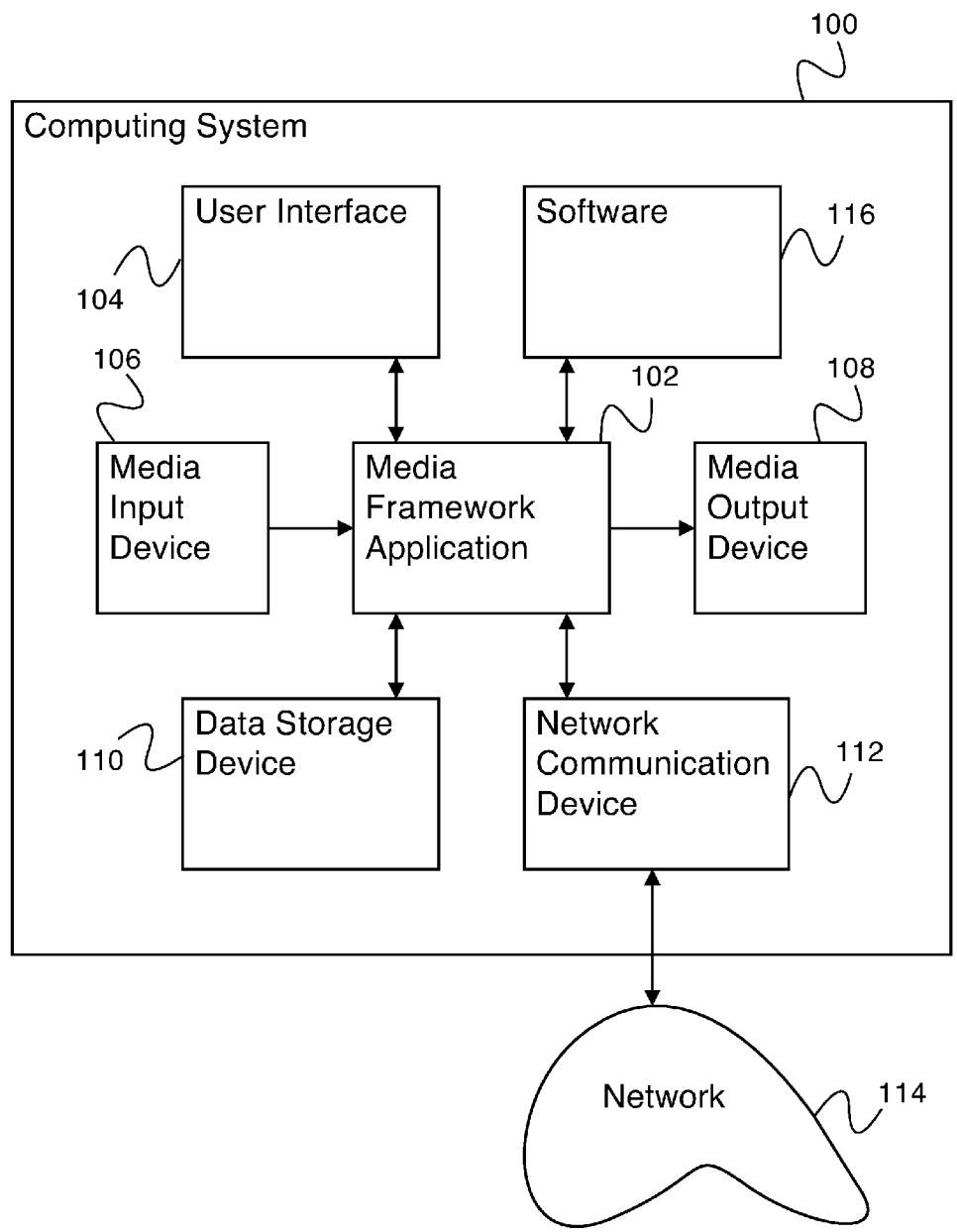
FIG. 1 is a block diagram illustrating an embodiment of a computing system with a media framework application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system is disclosed. The system comprises a first media framework component, a second media framework component, and a media framework. The media framework comprises a simplified media framework interface and a non-tunnel mode handler. The simplified media framework interface handles connectivity between a first port and a second port in a tunnel mode. The non-tunnel mode handler converts connectivity of a third port and a fourth port in a non-tunnel mode to appear to be the tunnel mode for the simplified media framework interface. The first port and the second port of the simplified media framework interface are coupled to a fifth port and a sixth port of the non-tunnel mode handler. The third port of the non-tunnel mode handler is coupled to the first media framework component and the fourth port of the non-tunnel mode handler is coupled to the second media framework component.

In some embodiments, the OpenMAX media framework specifies both tunnel mode and non-tunnel mode communication between components. The disclosed media framework comprises a simplified media framework that does not handle non-tunnel mode communication between two components and a non-tunnel mode handler that handles non-tunnel mode communication between two components and makes it appear as if it is a tunnel mode communication for the simplified media framework. The simplified media framework comprises an OpenMax media framework except that it does not handle non-tunnel mode communication between components. In various embodiments, components comprise file handler(s), file container parser(s), audio renderer(s), video renderer(s), audio decoder(s), video decoder(s), or any other appropriate media framework component. In some embodiments, the non-tunnel mode handler makes the simplified media framework easier to implement. In some embodiments, the simplified media framework is able to handle more complex graphs of components more easily and remain a fully OpenMAX compliant media framework.

Architecture for an efficient media framework is disclosed. Software for efficiently handling non-tunnel mode communications among OpenMAX media framework components is developed and modularized separately from the OpenMAX media framework implementation. The non-tunnel mode handling software interfaces with components and allows them to communicate in either tunnel mode or non-tunnel mode, as they desire, handling non-tunnel mode communication as though it were the media framework. The handling software also interfaces with the media framework and informs it that all components are communicating in tunnel mode regardless of their actual communication mode. Communications between the media framework and the components pass through the handling software. Communications not related to inter-component communication are passed on from the handling software to the component at which they were directed. Communications related to inter-component communication are intercepted by the handling software and translated to account for the discrepancy occurring because the media framework functions as though the component is in tunnel mode even though it may be in non-tunnel mode.

FIG. 1 is a block diagram illustrating an embodiment of a computing system with a media framework application. In various embodiments, computing system 100 comprises a computer, a mobile phone or other mobile computing system, an embedded computing system, or any other appropriate computing system. In the example shown, computing system 100 comprises media framework application 102. In various embodiments, media framework application 102 comprises a media framework application or a translated media framework application. Media framework application 102 communicates with user interface 104, media input device 106, media output device 108, data storage device 110, network communication device 112, and software 116. User interface 104 comprises a user interface for allowing a computing system user to interact with media framework 102 and other software 116. In some embodiments, user interface 104 comprises a device for presenting information and choices to a user (e.g., a display) and a device for receiving information from a user (e.g., a mouse, a keyboard, etc.). Media input device 106 comprises a device for receiving media input (e.g., a still camera, a video camera, a microphone) and relaying it to software 116 on computing system 100 (e.g., media framework application 102). In various embodiments, media input comprises a streaming data input that arrives via an Internet connection, a WiFi network connection, a Bluetooth connection, a 3G/4G cellular network connection, or any other appropriate media input. Media output device 108 comprises a device for projecting media output (e.g., a video display, a speaker, headphones, projector, etc.) received from software on computing system 100 (e.g., media framework application 102). Data storage device 110 comprises a device for storing data (e.g., media data, media metadata, system information data, user data, network data, or any other appropriate data) and receiving data from and delivering data to software on computing system 100 (e.g., media framework application 102). Network communication device 112 comprises a device for communicating data (e.g., media data, media metadata, system information data, user data, network data, or any other appropriate data) with a network (e.g., network 114) and receiving data from and delivering data to software on computing system 100 (e.g., media framework application 102). In various embodiments, network 114 comprises a local area network, a wide area network, a wired network, a wireless network, the Internet, a fiber network, a storage area network, a cellular network, or any other appropriate network enabling communication. Software 116 comprises other software present on computing system 100. In various embodiments, software 116 comprises system software, media software, data processing software, user interface software, or any other appropriate software on computing system 100.

In some embodiments, computing system 100 comprises a smart phone that includes a media framework coupled to one or more components, where the media framework coupled to the one or more components is capable of loading a data file—for example, a video or audio file—and processing the data file to present the data file to a user. In various embodiments, the data file is presented to the user as a video stream displayed using a color or black and white display or an audio stream output using a speaker or headphones or broadcast to a wireless connected audio output device (e.g., a Bluetooth connected head set). In some embodiments, processing the data file includes decompressing or decrypting the data file— for example, processing the data file compatible with a format such as MPEG-1, MPEG2, MPEG4 (e.g. formats specified by the Moving Picture Experts Group), H.264, AAC, MP3, Windows Media Audio, Windows Media Video, MIDI, media containers such as AVI, ASF, WAV, AAC, or MP4. In various embodiments, data storage device 110 comprises a solid state memory (e.g., a random access memory), a magnetic memory, an optical memory, or any other appropriate data storage device.

Figure 2A:
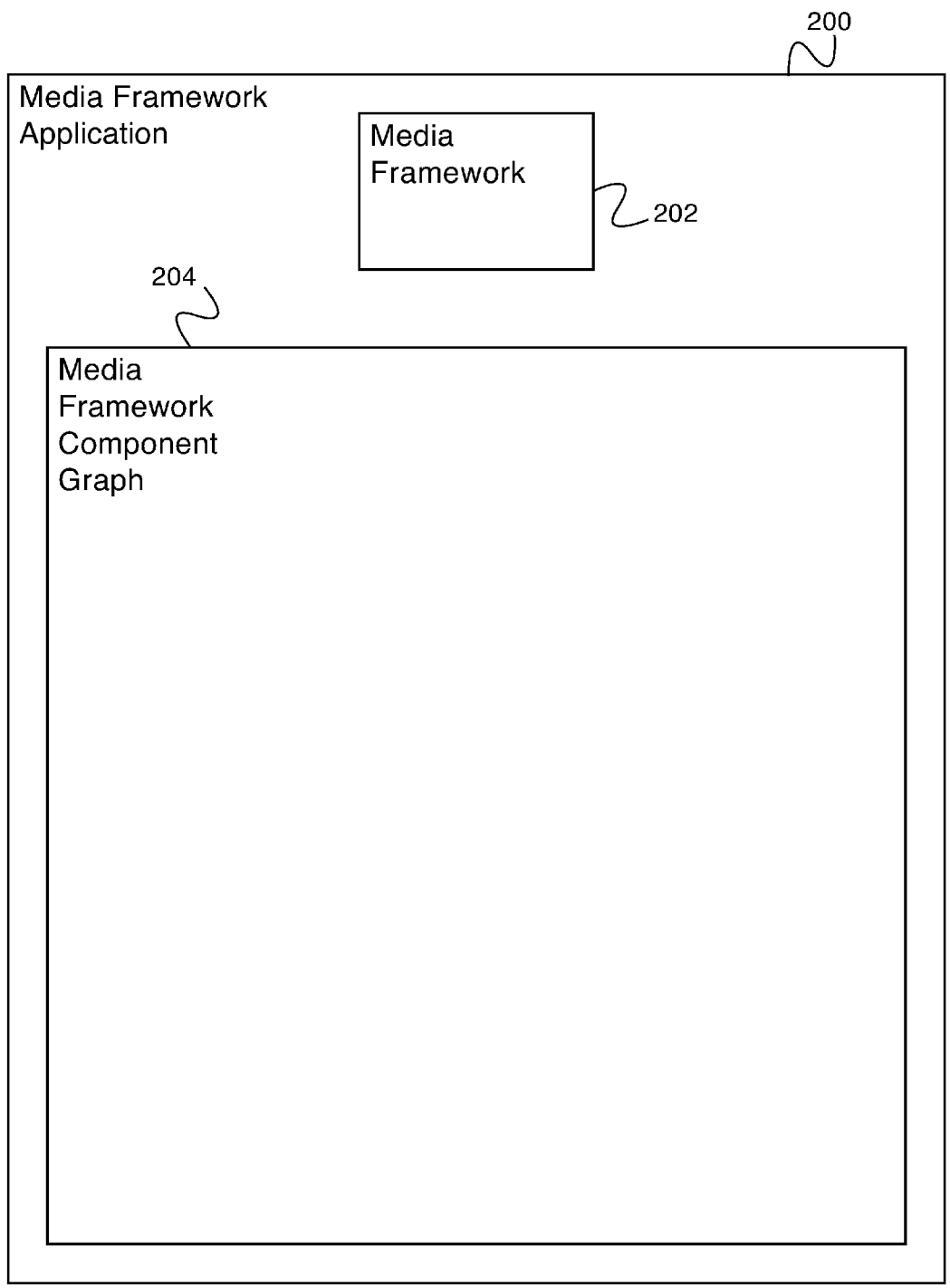
FIG. 2A is a block diagram illustrating an embodiment of a media framework application.

FIG. 2A is a block diagram illustrating an embodiment of a media framework application. In some embodiments, media framework application 200 comprises media framework application 102 of FIG. 1. In the example shown, media framework application 200 comprises media framework 202 and media framework component graph 204. In some embodiments, media framework 202 comprises an OpenMAX framework. In the example shown, media framework component graph 204 is empty, comprising no components. In some embodiments, media framework application 200 will load one or more media framework components into media framework component graph 204 to create its functionality.

Figure 2B:
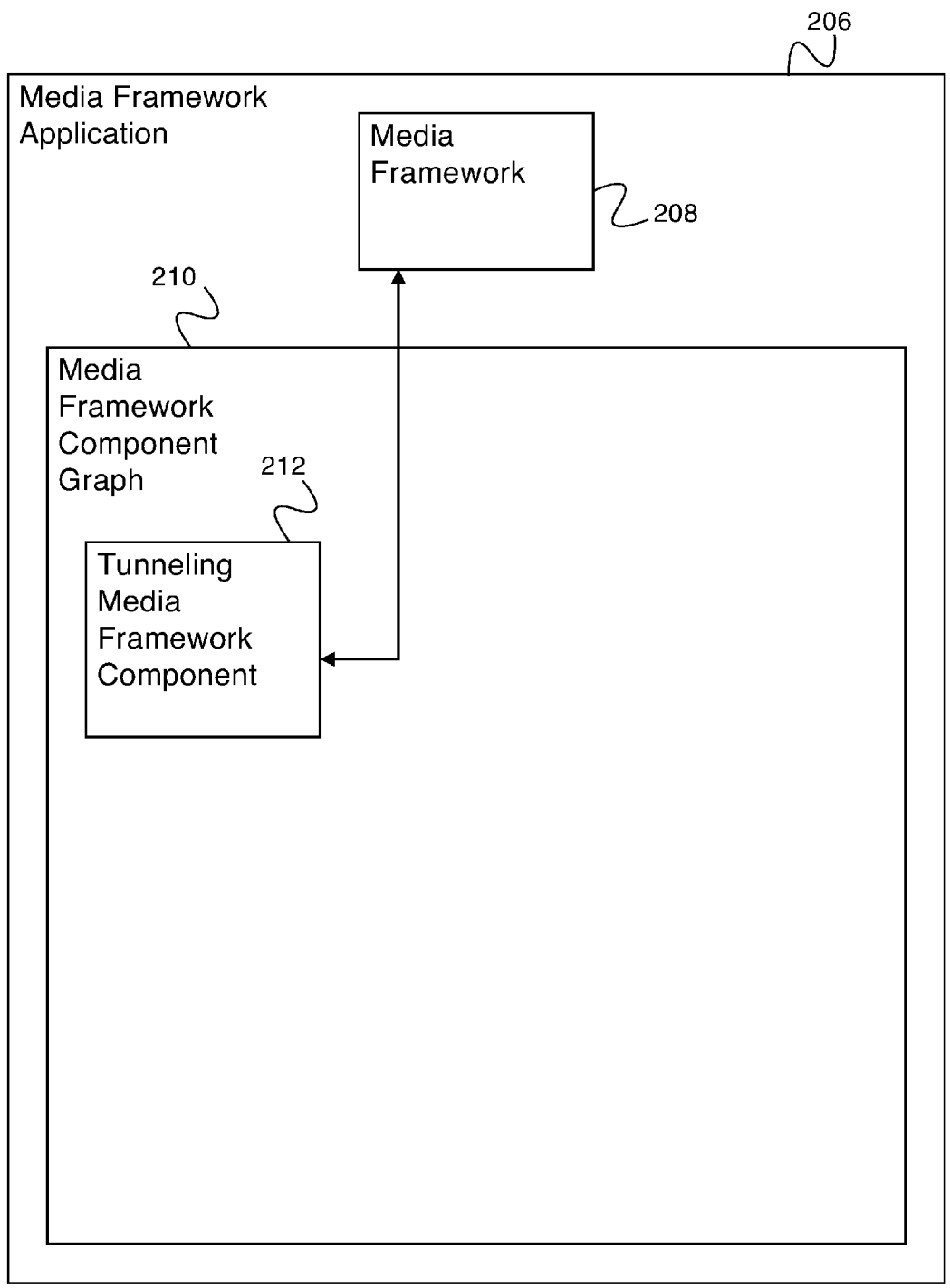
FIG. 2B is a block diagram illustrating an embodiment of a media framework application.

FIG. 2B is a block diagram illustrating an embodiment of a media framework application. In some embodiments, media framework application 206 comprises media framework application 102 of FIG. 1. In the example shown, media framework application 206 comprises media framework 208 and media framework component graph 210. In some embodiments, media framework 208 comprises an Open-MAX framework. Media framework component graph 210 comprises tunneling media framework component 212. Tunneling media framework component 212 comprises a media framework component that is able to communicate with other media framework components in tunnel mode (e.g., it can communicate directly with other media framework components without using a media framework as an intermediary). Tunneling media framework components are additionally able to communicate with other media framework components in non-tunnel mode (e.g., using a media framework as an intermediary). In various embodiments, tunneling media framework component 212 comprises one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When tunneling media framework component 212 is added to media framework component graph 210, communication is established to between tunneling media framework component 212 and media framework 208. In some embodiments, media framework application 206 will load one or more additional media framework components into media framework component graph 210 to create its functionality.

Figure 2C:
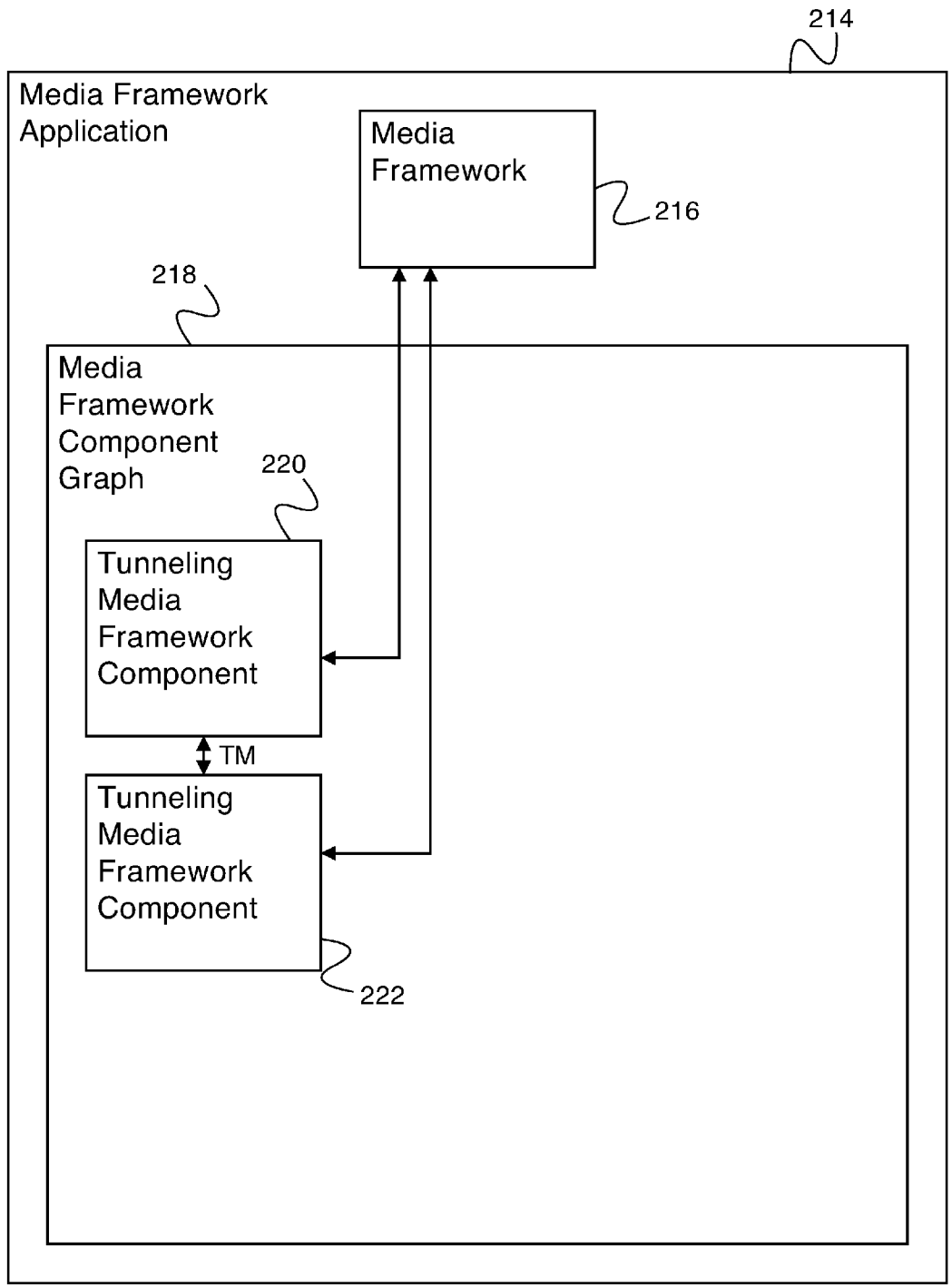
FIG. 2C is a block diagram illustrating an embodiment of a media framework application.

FIG. 2C is a block diagram illustrating an embodiment of a media framework application. In some embodiments, media framework application 214 comprises media framework application 102 of FIG. 1. In the example shown, media framework application 214 comprises media framework 216 and media framework component graph 218. In some embodiments, media framework 216 comprises an Open-MAX framework. Media framework component graph 218 comprises tunneling media framework component 220 and tunneling media framework component 222. Tunneling media framework component 220 and tunneling media framework component 222 each comprise a media framework component that is able to communicate with other media framework components in tunnel mode (e.g., each can communicate directly with other media framework components without using a media framework as an intermediary). Tunneling media framework components are additionally able to communicate with other media framework components in non-tunnel mode (e.g., using a media framework as an intermediary). In various embodiments, tunneling media framework component 220 and tunneling media framework component 222 each comprise one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When tunneling media framework component 222 is added to media framework component graph 218, communication is established between tunneling media framework component 222 and media framework 216. Additionally, tunnel mode communication is established between tunneling media framework component 222 and tunneling media framework component 220. In some embodiments, media framework application 214 will load one or more additional media framework components into media framework component graph 218 to create its functionality.

Figure 2D:
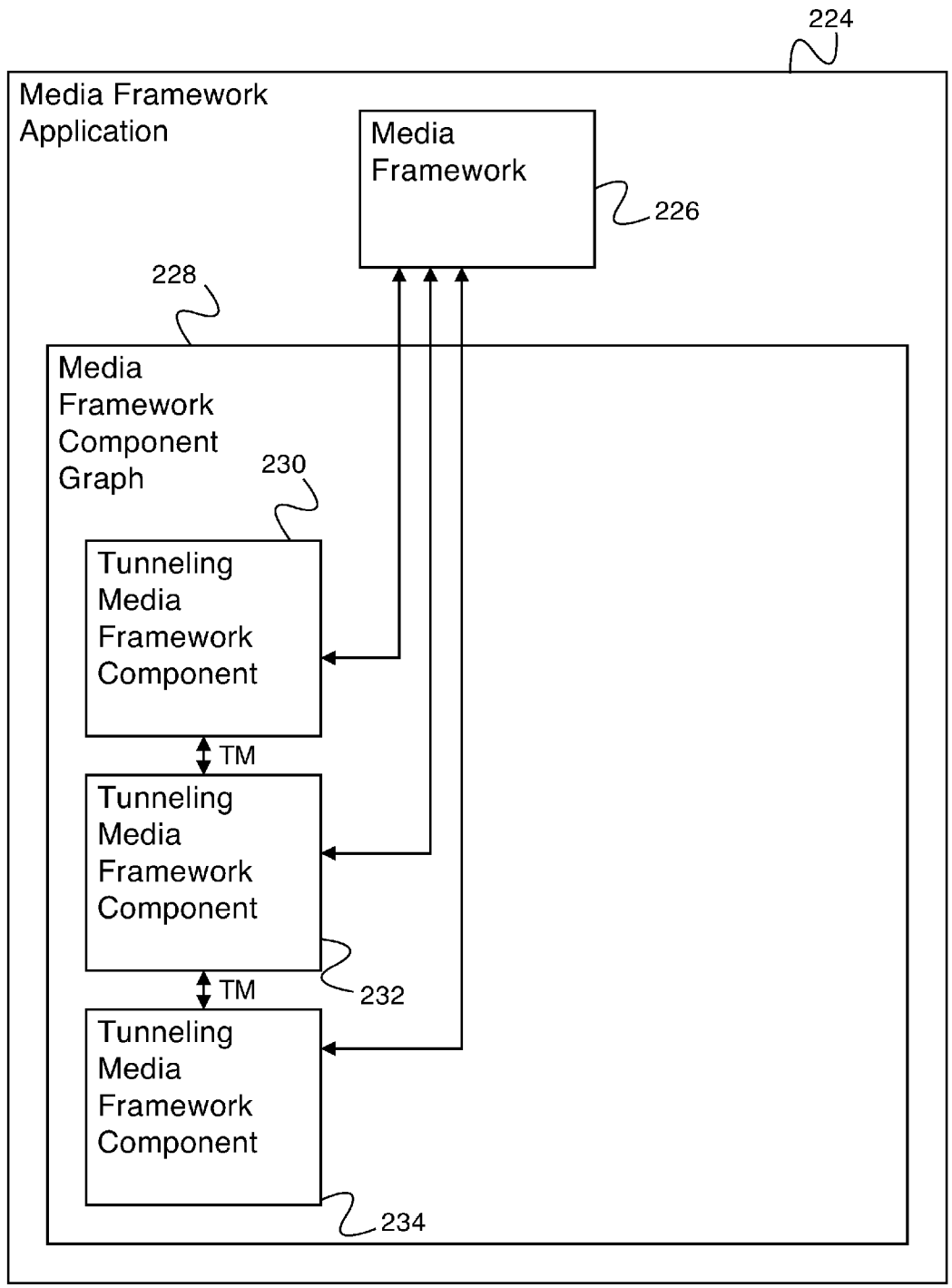
FIG. 2D is a block diagram illustrating an embodiment of a media framework application.

FIG. 2D is a block diagram illustrating an embodiment of a media framework application. In some embodiments, media framework application 224 comprises media framework application 102 of FIG. 1. In the example shown, media framework application 224 comprises media framework 226 and media framework component graph 228. In some embodiments, media framework 226 comprises an Open-MAX framework. Media framework component graph 228 comprises tunneling media framework component 230, tunneling media framework component 232, and tunneling media framework component 234. Tunneling media framework component 230, tunneling media framework component 232, and tunneling media framework component 234 each comprise a media framework component that is able to communicate with other media framework components in tunnel mode (e.g., each can communicate directly with other media framework components without using a media framework as an intermediary). Tunneling media framework components are additionally able to communicate with other media framework components in non-tunnel mode (e.g., using a media framework as an intermediary). In various embodiments, tunneling media framework component 230, tunneling media framework component 232, and tunneling media framework component 234 each comprise one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When tunneling media framework component 234 is added to media framework component graph 228, communication is established between tunneling media framework component 234 and media framework 226. Additionally, tunnel mode communication is established between tunneling media framework component 234 and tunneling media framework component 232. In some embodiments, media framework application 224 will load one or more additional media framework components into media framework component graph 228 to create its functionality.

Figure 2E:
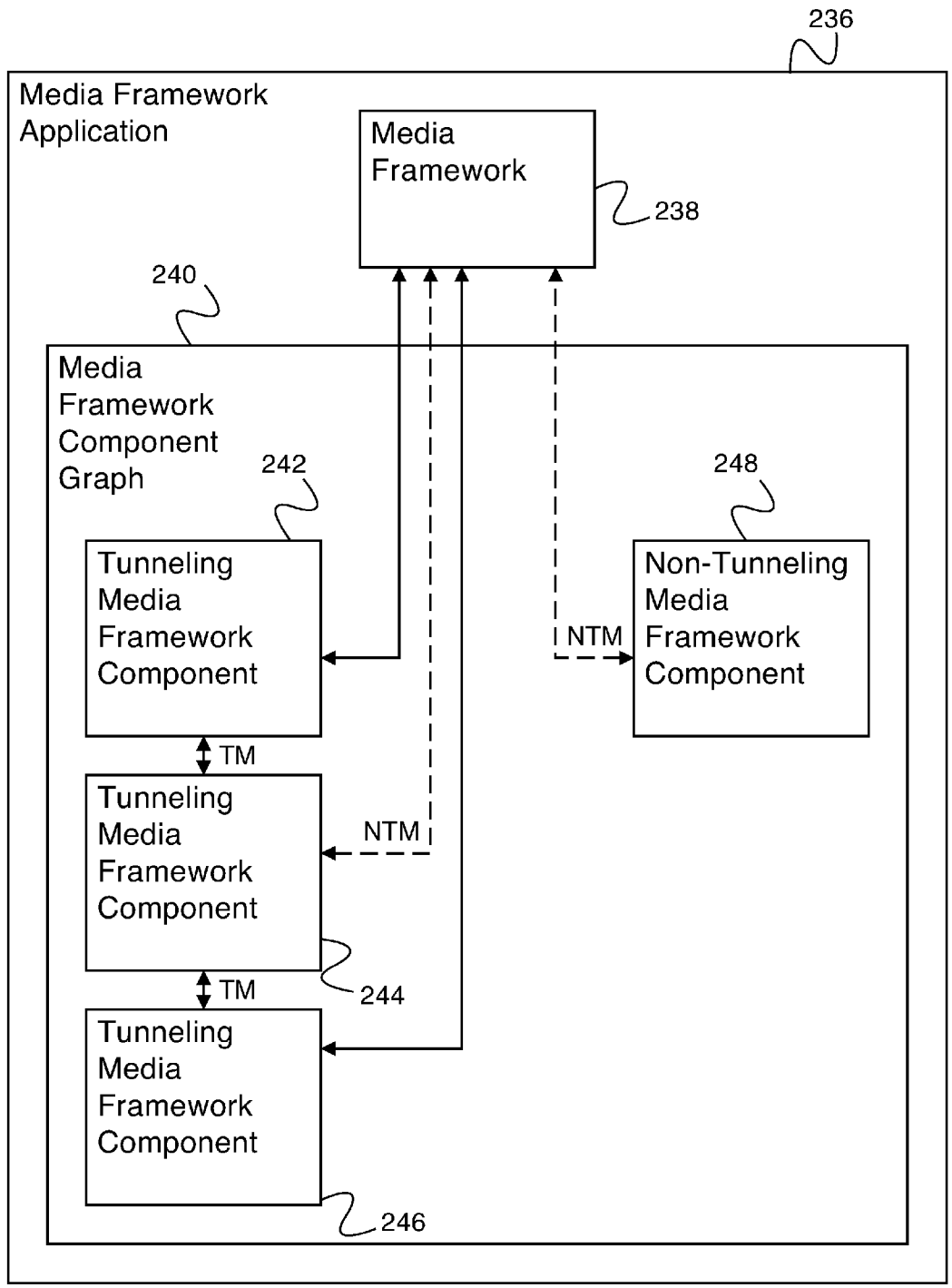
FIG. 2E is a block diagram illustrating an embodiment of a media framework application.

FIG. 2E is a block diagram illustrating an embodiment of a media framework application. In some embodiments, media framework application 236 comprises media framework application 102 of FIG. 1. In the example shown, media framework application 236 comprises media framework 238 and media framework component graph 240. In some embodiments, media framework 238 comprises an OpenMAX framework. Media framework component graph 240 comprises tunneling media framework component 242, tunneling media framework component 244, tunneling media framework component 246, and non-tunneling media framework component 248. Tunneling media framework component 242, tunneling media framework component 244, and tunneling media framework component 246 each comprise a media framework component that is able to communicate with other media framework components in tunnel mode (e.g., each can communicate directly with other media framework components without using a media framework as an intermediary). Tunneling media framework components are additionally able to communicate with other media framework components in non-tunnel mode (e.g., using a media framework as an intermediary). Non-tunneling media framework component 248 comprises a media framework component that is only able to communicate with other media framework components in non-tunnel mode (e.g., it requires a media framework as an intermediary for communication with other media framework components). In various embodiments, tunneling media framework component 242, tunneling media framework component 244, tunneling media framework component 246, and non-tunneling media framework component 248 each comprise one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When non-tunneling media framework component 248 is added to media framework component graph 240, communication is established between non-tunneling media framework component 248 and media framework 238. Additionally, non-tunnel mode communication is established between non-tunneling media framework component 248 and tunneling media framework component 244, and the connections between both tunneling media framework component 244 and non-tunneling media framework component 248 with media framework 238 are enabled for non-tunnel mode communication. In various embodiments, enabling a connection for non-tunnel mode communication comprises reserving memory, transmitting memory locations, establishing a non-tunnel communications handler process, initializing a port in non-tunnel mode, or any other appropriate action. In some embodiments, media framework application 236 will load one or more additional media framework components into media framework component graph 240 to create its functionality.

Figure 2F:
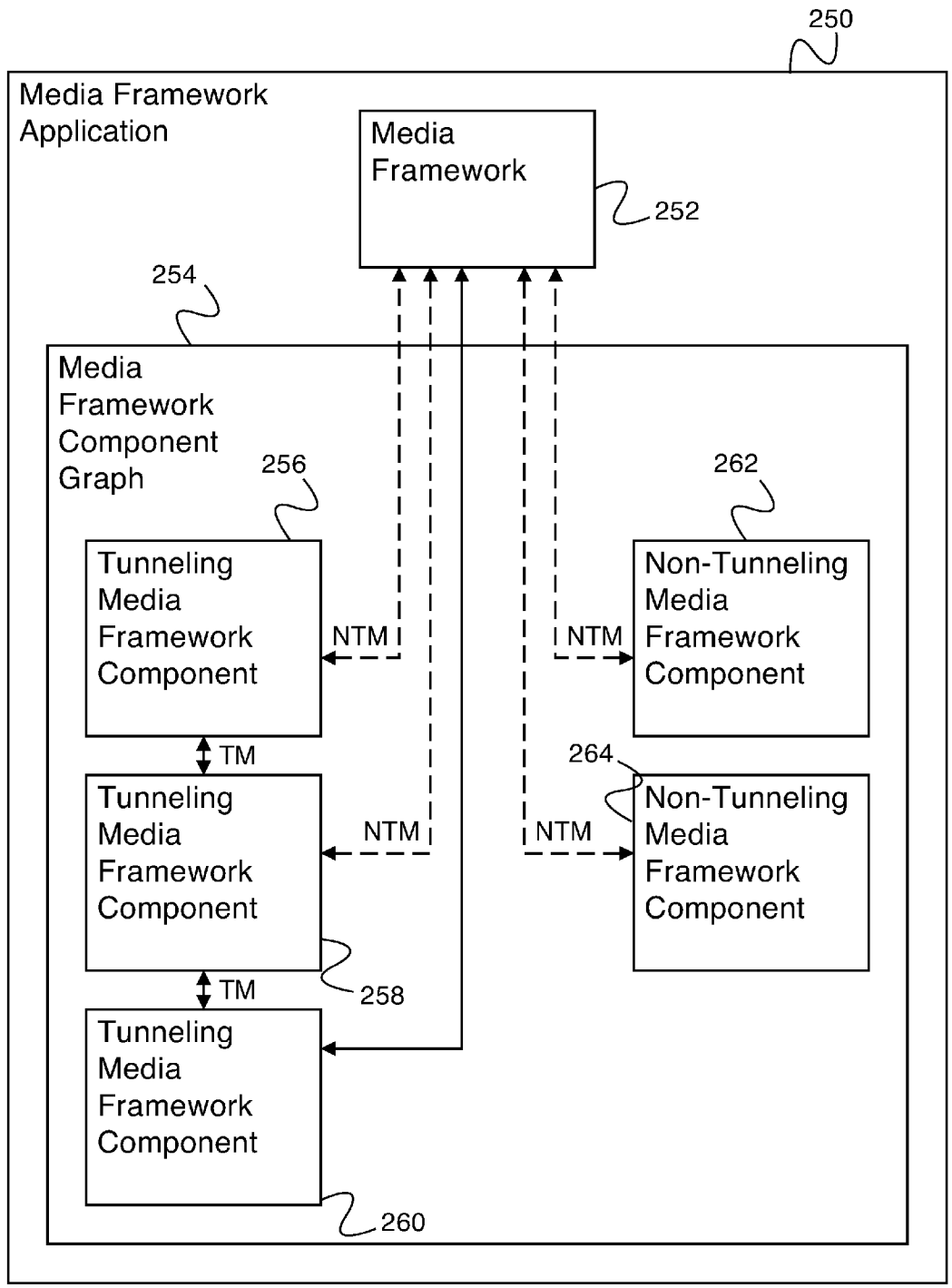
FIG. 2F is a block diagram illustrating an embodiment of a media framework application.

FIG. 2F is a block diagram illustrating an embodiment of a media framework application. In some embodiments, media framework application 250 comprises media framework application 102 of FIG. 1. In the example shown, media framework application 250 comprises media framework 252 and media framework component graph 254. In some embodiments, media framework 252 comprises an OpenMAX framework. Media framework component graph 254 comprises tunneling media framework component 256, tunneling media framework component 258, tunneling media framework component 260, non-tunneling media framework component 262, and non-tunneling media framework component 264. Tunneling media framework component 256, tunneling media framework component 258, and tunneling media framework component 260 each comprise a media framework component that is able to communicate with other media framework components in tunnel mode (e.g., each can communicate directly with other media framework components without using a media framework as an intermediary). Tunneling media framework components are additionally able to communicate with other media framework components in non-tunnel mode (e.g., using a media framework as an intermediary). Non-tunneling media framework component 262 and non-tunneling media framework component 264 each comprise a media framework component that is only able to communicate with other media framework components in non-tunnel mode (e.g., each requires a media framework as an intermediary for communication with other media framework components). In various embodiments, tunneling media framework component 256, tunneling media framework component 258, tunneling media framework component 260, non-tunneling media framework component 262, and non-tunneling media framework component 264 each comprise one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When non-tunneling media framework component 264 is added to media framework component graph 254, communication is established between non-tunneling media framework component 264 and media framework 252. Additionally, non-tunnel mode communication is established between non-tunneling media framework component 264 and tunneling media framework component 256, and the connections between both tunneling media framework component 256 and non-tunneling media framework component 264 with media framework 252 are enabled for non-tunnel mode communication. In various embodiments, enabling a connection for non-tunnel mode communication comprises reserving memory, transmitting memory locations, establishing a non-tunnel communications handler process, initializing a port in non-tunnel mode, or any other appropriate action. In some embodiments, media framework application 250 will load one or more additional media framework components into media framework component graph 254 to create its functionality.

Figure 2G:
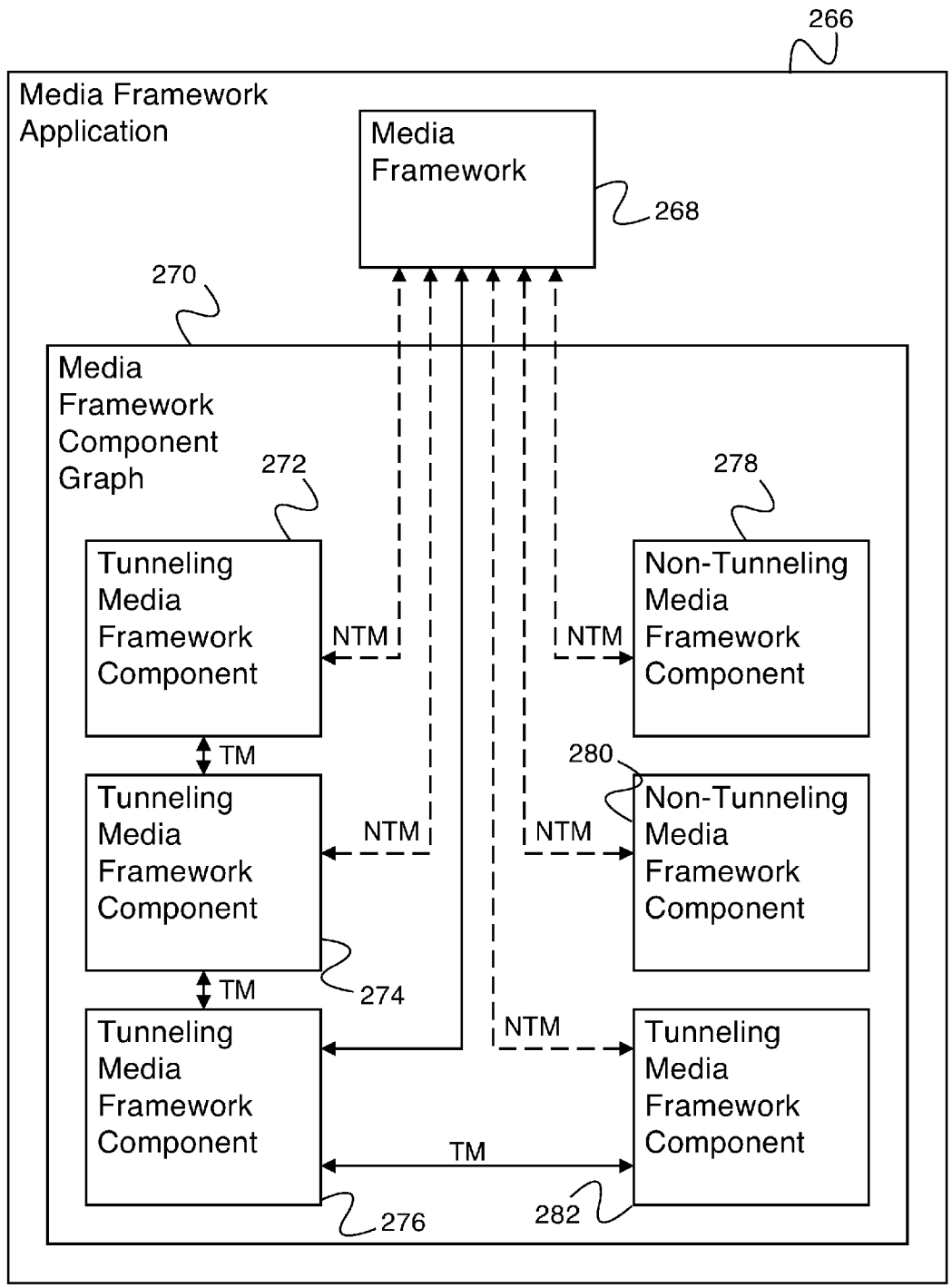
FIG. 2G is a block diagram illustrating an embodiment of a media framework application.

FIG. 2G is a block diagram illustrating an embodiment of a media framework application. In some embodiments, media framework application 266 comprises media framework application 102 of FIG. 1. In the example shown, media framework application 266 comprises media framework 268 and media framework component graph 270. In some embodiments, media framework 268 comprises an OpenMAX framework. Media framework component graph 270 comprises tunneling media framework component 272, tunneling media framework component 274, tunneling media framework component 276, non-tunneling media framework component 278, non-tunneling media framework component 280, and tunneling media framework component 282. Tunneling media framework component 272, tunneling media framework component 274, tunneling media framework component 276, and tunneling media framework component 282 each comprise a media framework component that is able to communicate with other media framework components in tunnel mode (e.g., each can communicate directly with other media framework components without using a media framework as an intermediary). Tunneling media framework components are additionally able to communicate with other media framework components in non-tunnel mode (e.g., using a media framework as an intermediary). Non-tunneling media framework component 278 and non-tunneling media framework component 280 each comprise a media framework component that is only able to communicate with other media framework components in non-tunnel mode (e.g., each requires a media framework as an intermediary for communication with other media framework components). In various embodiments, tunneling media framework component 272, tunneling media framework component 274, tunneling media framework component 276, non-tunneling media framework component 278, non-tunneling media framework component 280, and tunneling media framework component 282 each comprise one or more of the following: a media framework component that communicates with a media input device (e.g., media input device 106 of FIG. 1), a media framework component that communicates with a media output device (e.g., media output device 108 of FIG. 1), a media framework component that communicates with a data storage device (e.g., data storage 110 of FIG. 1), a media framework component that communicates with a network communication device (e.g., network communication device 112 of FIG. 1), a media framework component that communicates with other software (e.g., software 116 of FIG. 1), a media framework component that processes audio, a media framework component that processes video, a media framework component that processes still images, a media framework component that processes media metadata, or any other appropriate kind of media framework component. When tunneling media framework component 282 is added to media framework component graph 270, communication is established between tunneling media framework component 282 and media framework 268. Tunnel mode communication is established between tunneling media framework component 282 and tunneling media framework component 276. Additionally, non-tunnel mode communication is established between tunneling media framework component 282 and non-tunneling media framework component 278, and the connections between both tunneling media framework component 282 and non-tunneling media framework component 278 with media framework 268 are enabled for non-tunnel mode communication. In various embodiments, enabling a connection for non-tunnel mode communication comprises reserving memory, transmitting memory locations, establishing a non-tunnel communications handler process, initializing a port in non-tunnel mode, or any other appropriate action.

Figure 3:
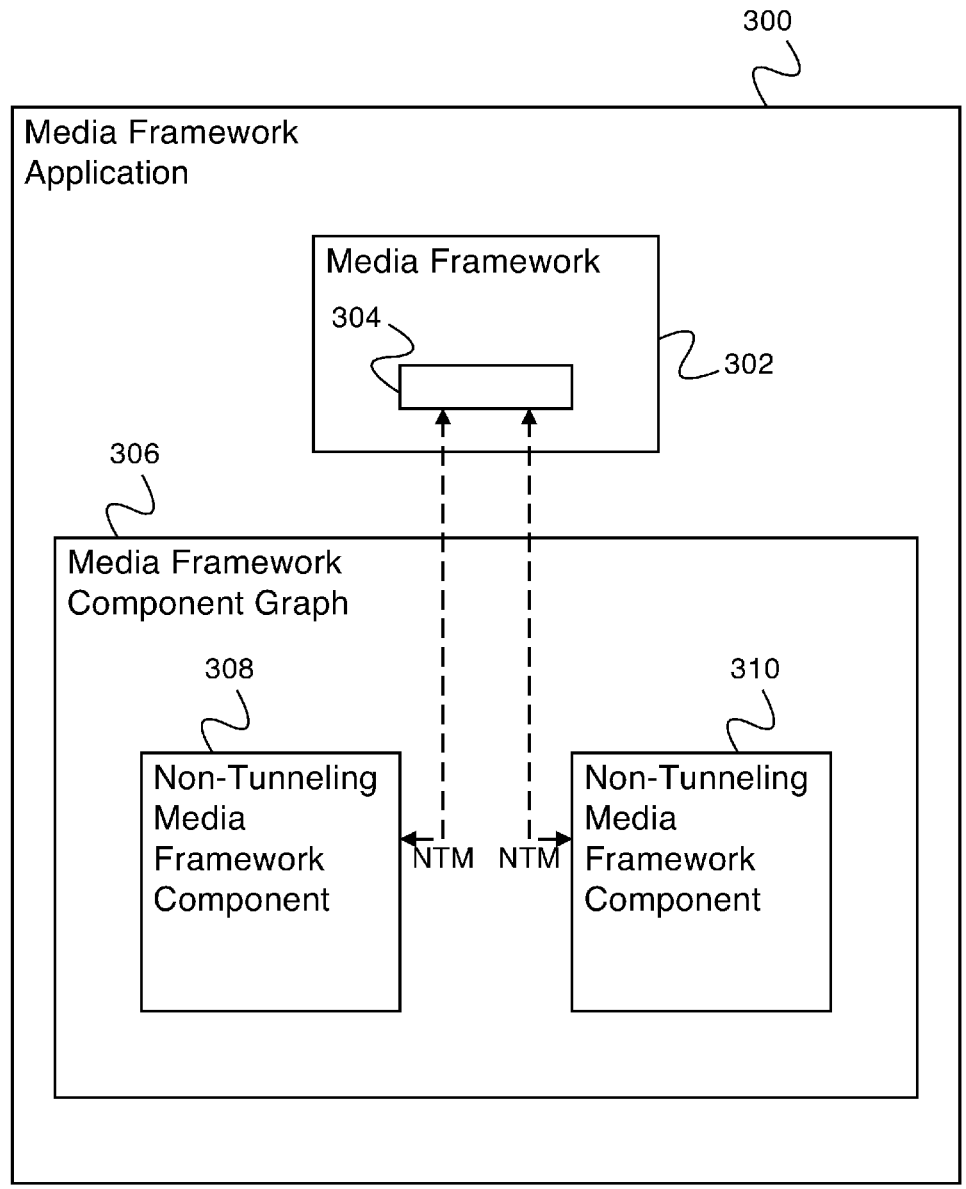
FIG. 3 is a block diagram illustrating an embodiment of a media framework application.

FIG. 3 is a block diagram illustrating an embodiment of a media framework application. In some embodiments, media framework application 300 comprises media framework application 102 of FIG. 1. In the example shown, media framework application 300 comprises media framework 302 and media framework component graph 306. In some embodiments, media framework 302 comprises an OpenMAX framework. Media framework component graph 306 comprises non-tunneling media framework component 308 and non-tunneling media framework component 310. In the example shown, non-tunnel mode communication is established between non-tunneling media framework component 308 and non-tunneling media framework component 310.

When non-tunnel mode communication is established between non-tunneling media framework component 308 and non-tunneling media framework component 310, media framework 302 creates buffer 304 and establishes links from non-tunneling media framework component 308 to buffer 304 and from non-tunneling media framework component 310 to buffer 304. Media framework 302 coordinates communications between non-tunneling media framework component 308 and non-tunneling media framework component 310 via buffer 304. In some embodiments, when non-tunneling media framework component 308 is to send data to non-tunneling media framework component 310, media framework 302 requests non-tunneling media framework component 308 to input data to buffer 304. When non-tunneling media framework component 308 has finished inputting data to buffer 304, it communicates to media framework 302 that it is finished. Media framework 302 then requests non-tunneling media framework component 310 to retrieve data from buffer 304. When non-tunneling media framework component 310 has finished retrieving data from buffer 304, it communicates to media framework 302 that it has finished, and the data transfer is complete. A complementary process occurs when non-tunneling media framework component 310 is to send data to non-tunneling media framework component 308.

In various embodiments, when non-tunnel mode communication is established between non-tunneling media framework component 308 and non-tunneling media framework component 310, media framework 302 decides the buffer utilization policy. The buffer utilization policy indicates buffers utilized for the communication between non-tunneling media framework component 308 and non-tunneling media framework component 310. Buffers may be located in non-tunneling media framework component 308, in non-tunneling media framework component 310, or in any other appropriate location. In various embodiments, a buffer is allocated using a "create a buffer" command or a buffer is not allocated or created. For instance, if either non-tunneling media framework component 308 or non-tunneling media framework component 310 has its own buffer, then media framework 302 will use an available buffer. In some embodiments, if both non-tunneling media framework component 308 and non-tunneling media framework component 310 insist on using their own buffer, then copying data from one buffer to the other may be required. Media framework 302 coordinates data flow between non-tunneling media framework component 308 and non-tunneling media framework component 310 regardless of whether the buffer used for communication is located within media framework 302 or in another location.

Figure 4:
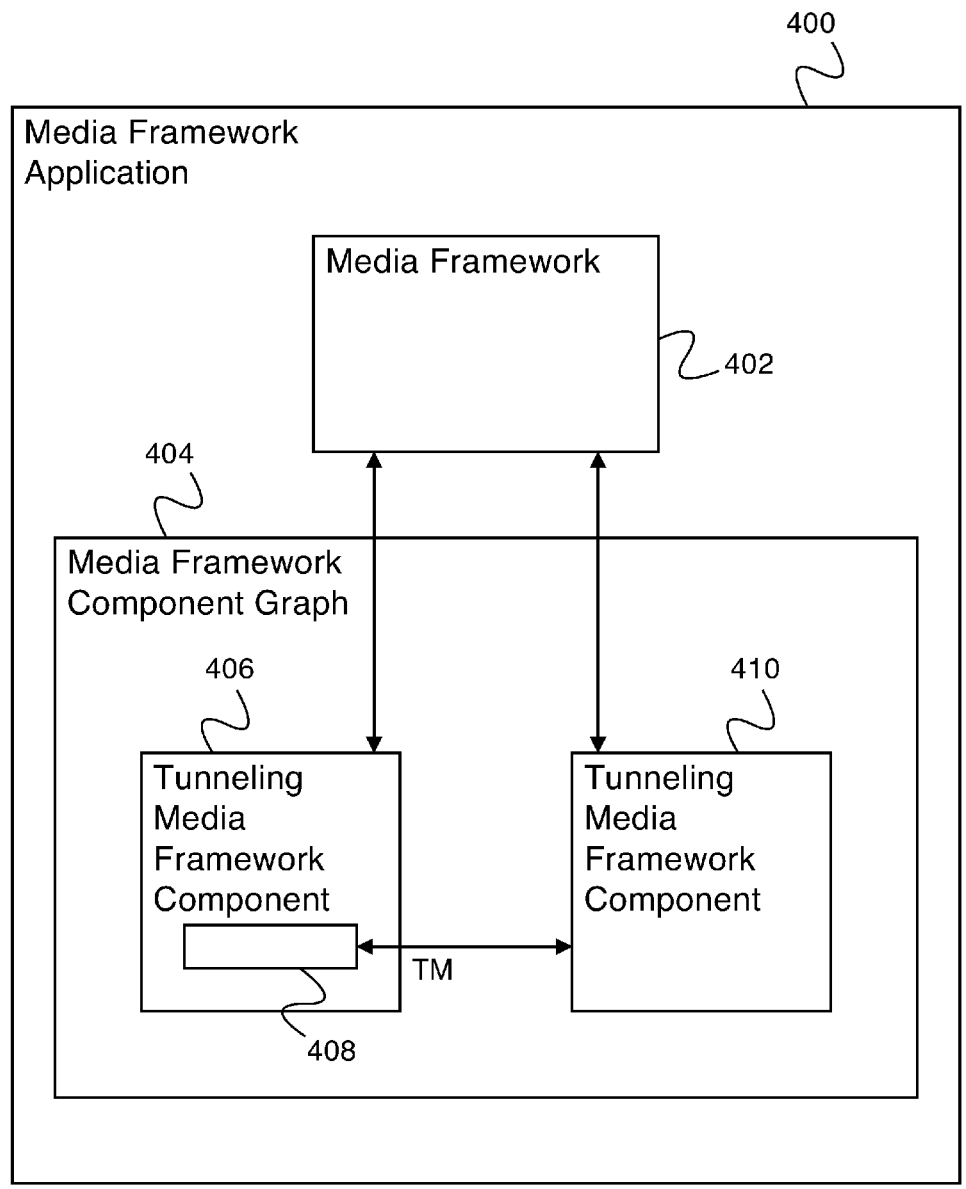
FIG. 4 is a block diagram illustrating an embodiment of a media framework application.

FIG. 4 is a block diagram illustrating an embodiment of a media framework application. In some embodiments, media framework application 400 comprises media framework application 102 of FIG. 1. In the example shown, media framework application 400 comprises media framework 402 and media framework component graph 404. In some embodiments, media framework 402 comprises an Open-MAX framework. Media framework component graph 404 comprises tunneling media framework component 406 and tunneling media framework component 410. In the example shown, tunnel mode communication is established between tunneling media framework component 406 and tunneling media framework component 410.

When tunnel mode communication is established between tunneling media framework component 406 and tunneling media framework component 410, tunneling media framework component 406 creates buffer 408 and establishes a link between tunneling media framework component 410 and buffer 408. In some embodiments, when tunneling media framework component 406 is to send data to tunneling media framework component 410, it inputs the data to buffer 408 and then communicates to tunneling media framework component 410 to retrieve the data from buffer 408. When tunneling media framework component 410 has finished retrieving the data from buffer 408, it communicates to tunneling media framework component 406 that it has finished, and the data transfer is complete. In various embodiments, when tunnel mode communication is established between tunneling media framework component 406 and tunneling media framework component 410, the communication buffer is established in tunneling media framework component 410, in another media framework component, or in any other appropriate location.

Figure 5:
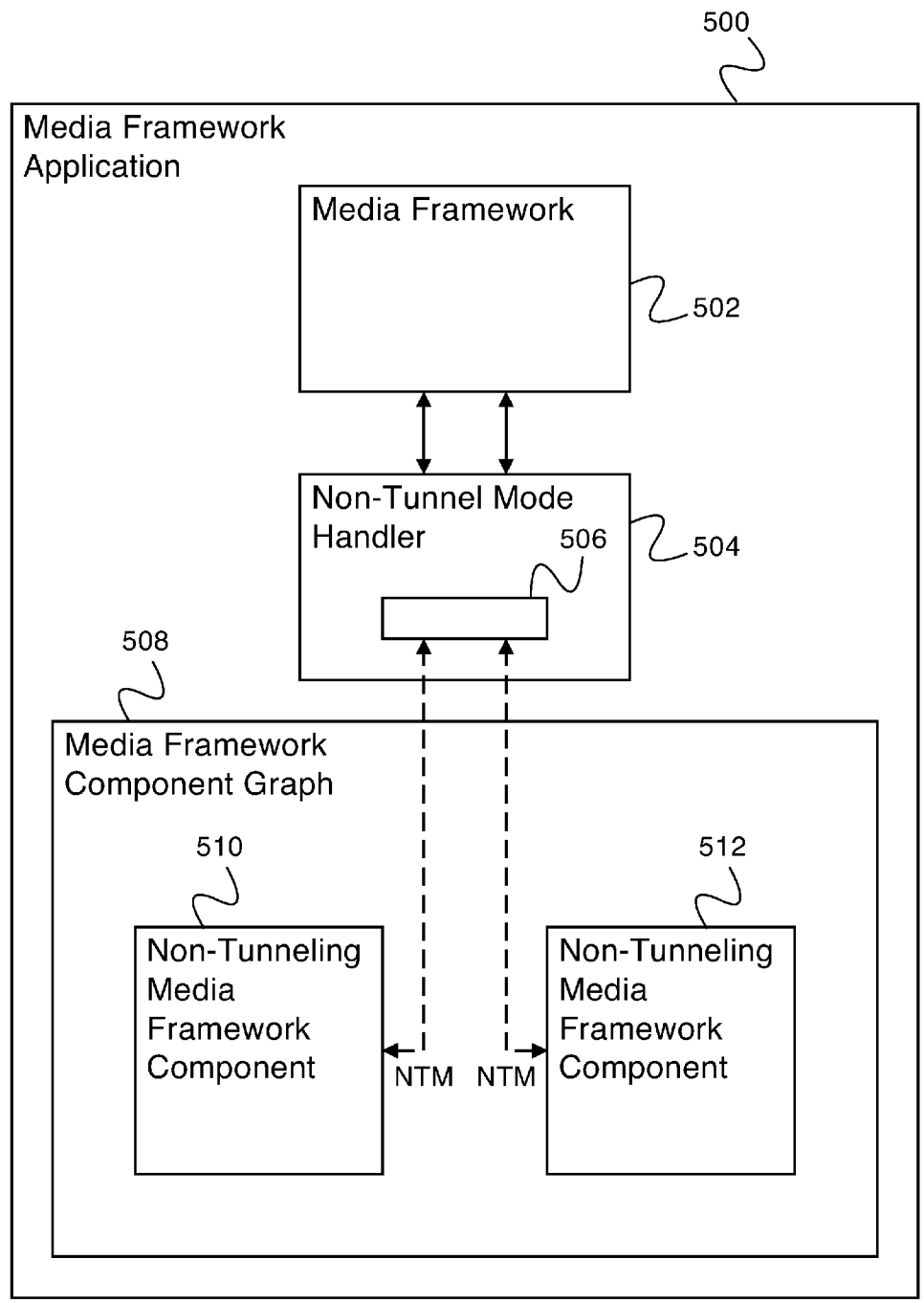
FIG. 5 is a block diagram illustrating an embodiment of a media framework application.

FIG. 5 is a block diagram illustrating an embodiment of a media framework application. In some embodiments, media framework application 500 comprises media framework application 102 of FIG. 1. In the example shown, media framework application 500 comprises media framework 502, non-tunnel mode handler 504, and media framework component graph 508. In some embodiments, media framework 502 comprises an OpenMAX framework. Media framework component graph 508 comprises non-tunneling media framework component 510 and non-tunneling media framework component 512. In the example shown, non-tunnel mode communication is established between non-tunneling media framework component 510 and non-tunneling media framework component 512 without media framework 502 being responsible for coordinating the communication.

In the example shown, communications between media framework 502 and non-tunneling media framework component 510 and non-tunneling media framework component 512 pass through non-tunnel mode handler 504. Communications not related to inter-component communication are passed from non-tunnel mode handler 504 to the component at which they were directed. Communications related to inter-component communication are intercepted by non-tunnel mode handler 504 and translated. The translation carried out by non-tunnel mode handler 504 ensures that media framework 502 can interact with non-tunneling media framework component 510 and non-tunneling media framework component 512 as though they are communicating in tunnel mode, despite their communicating in non-tunnel mode coordinated by non-tunnel mode handler 504, without discrepancies or errors arising.

When non-tunnel mode communication is established between non-tunneling media framework component 510 and non-tunneling media framework component 512, non-tunnel mode handler 504 creates buffer 506 and establishes links from non-tunneling media framework component 510 to buffer 506 and from non-tunneling media framework component 512 to buffer 506. Non-tunnel mode handler 504 coordinates communications between non-tunneling media framework component 510 and non-tunneling media framework component 512 via buffer 506. In some embodiments, when non-tunneling media framework component 510 is to send data to non-tunneling media framework component 512, non-tunnel mode handler 504 requests non-tunneling media framework component 510 to input data to buffer 506. When non-tunneling media framework component 510 has finished inputting data to buffer 506, it communicates to non-tunnel mode handler 504 that it is finished. Non-tunnel mode handler 504 then requests non-tunneling media framework component 512 to retrieve data from buffer 506. When non-tunneling media framework component 512 has finished retrieving data from buffer 506, it communicates to non-tunnel mode handler 504 that it has finished, and the data transfer is complete. A complementary process occurs when non-tunneling media framework component 512 is to send data to non-tunneling media framework component 510.

In various embodiments, when non-tunnel mode communication is established between non-tunneling media framework component 510 and non-tunneling media framework component 512, non-tunnel mode handler 504 creates a buffer located in non-tunneling media framework component 510, located in non-tunneling media framework component 512, or in any other appropriate location. Non-tunnel mode handler 504 coordinates data flow between non-tunneling media framework component 510 and non-tunneling media framework component 512 regardless of whether the buffer used for communication is located within non-tunnel mode handler 504 or in another location.

When non-tunnel mode communication is established between non-tunneling media framework component 510 and non-tunneling media framework component 512, non-tunnel mode handler 504 communicates to media framework 502 that non-tunneling media framework component 510 and non-tunneling media framework component 512 are communicating in tunnel mode. Media framework 502 has no responsibility for coordinating communication between non-tunneling media framework component 510 and non-tunneling media framework component 512 if they are communicating in tunnel mode. Responsibility for coordinating communication between non-tunneling media framework component 510 and non-tunneling media framework component 512 is then left to non-tunnel mode handler 504. In the event that media framework component graph 508 comprises a complex graph of media framework components including non-tunnel mode communication (e.g., media framework component graph 270 of FIG. 2G), media framework 502 is able to treat the graph as though all communications are made in tunnel mode, reducing the complexity it has to coordinate.

Figure 6:
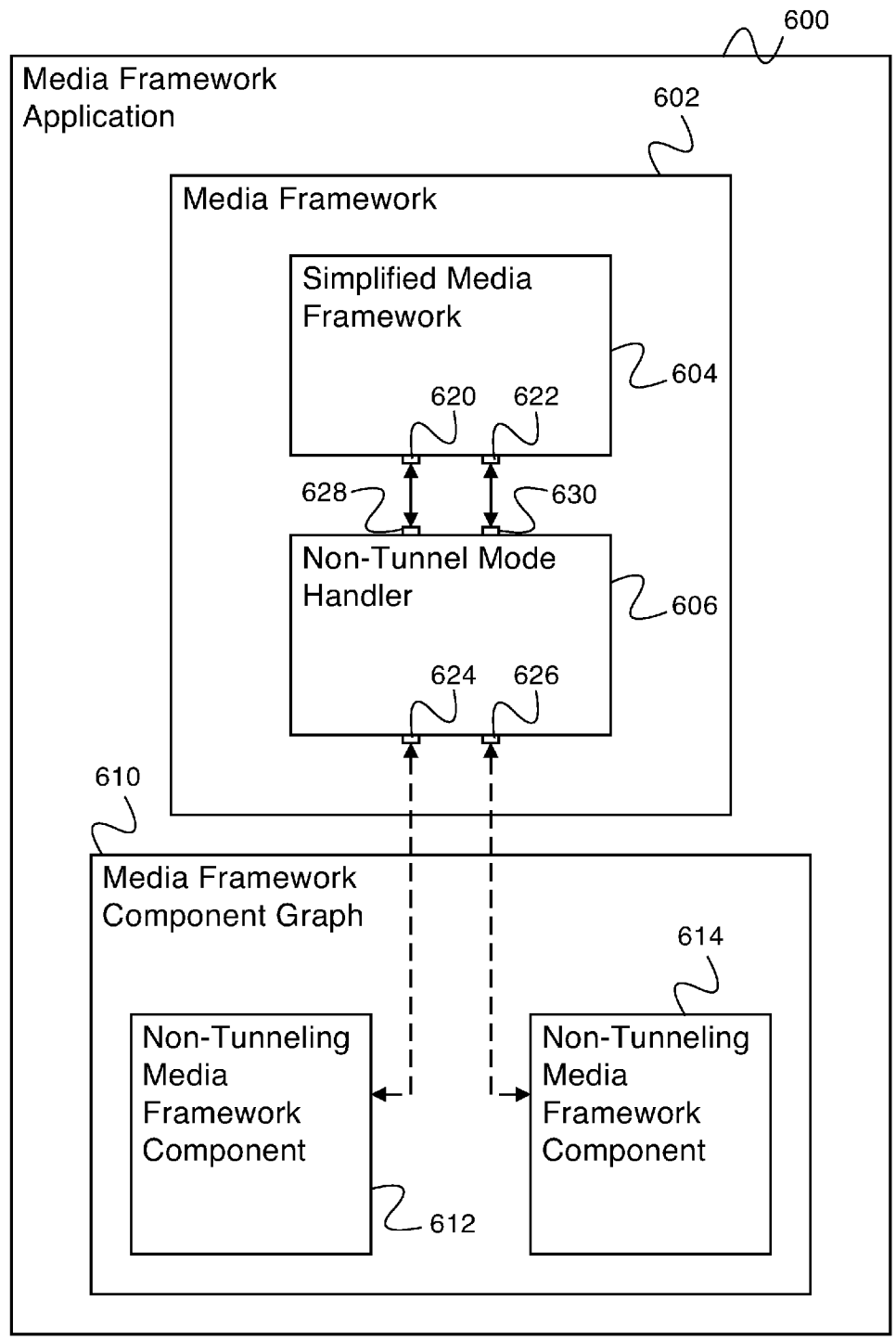
FIG. 6 is a block diagram illustrating an embodiment of a media framework application.

FIG. 6 is a block diagram illustrating an embodiment of a media framework application. In some embodiments, media framework application 600 comprises media framework application 102 of FIG. 1. In the example shown, media framework application 600 comprises media framework 602 and media framework component graph 610. In some embodiments, media framework 602 comprises an OpenMAX framework. Media framework 602 comprises simplified media framework 604 and non-tunnel mode handler 606. Media framework component graph 610 comprises non-tunneling media framework component 612 and non-tunneling media framework component 614.

In the example shown, simplified media framework 604 handles connectivity between port 620 and port 622 in a tunnel mode (e.g., as though components connected to port 620 and port 622 are communicating in tunnel mode as described in the section regarding FIG. 4). Non-tunnel mode handler 606 converts connectivity between port 624 and port 626 in a non-tunnel mode (e.g., components connected to port 624 and port 626 are communicating in a non-tunnel mode as described in the section regarding FIG. 3) to appear as connectivity in a tunnel mode at port 628 and port 630. Port 620 of simplified media framework 604 is coupled to port 628 of non-tunnel mode handler 606, and port 622 of simplified media framework 604 is coupled to port 630 of non-tunnel mode handler 606. Non-tunneling media framework 612 is coupled to port 624 of non-tunnel mode handler 606 and non-tunneling media framework component 614 is coupled to port 626 of non-tunnel mode handler 606. Communication between non-tunneling media framework component 612 and non-tunneling media framework component 614 is handled in non-tunnel mode by non-tunnel mode handler 606 at port 624 and port 626, and is converted to appear as components communicating in tunnel mode at port 628 and port 630, which are controlled by simplified media framework 604 at port 620 and port 622.

When a media framework developer is developing simplified media framework 604 for use with non-tunnel mode handler 606, the media framework developer is able to leave out the parts of the media framework regarding non-tunnel mode communication. Development complexity and time is thereby reduced, and a simplified media framework is created. Simplified media framework 604 is combined with non-tunnel mode handler 606 to create media framework 602, which conforms to media framework specifications.

Figure 7:
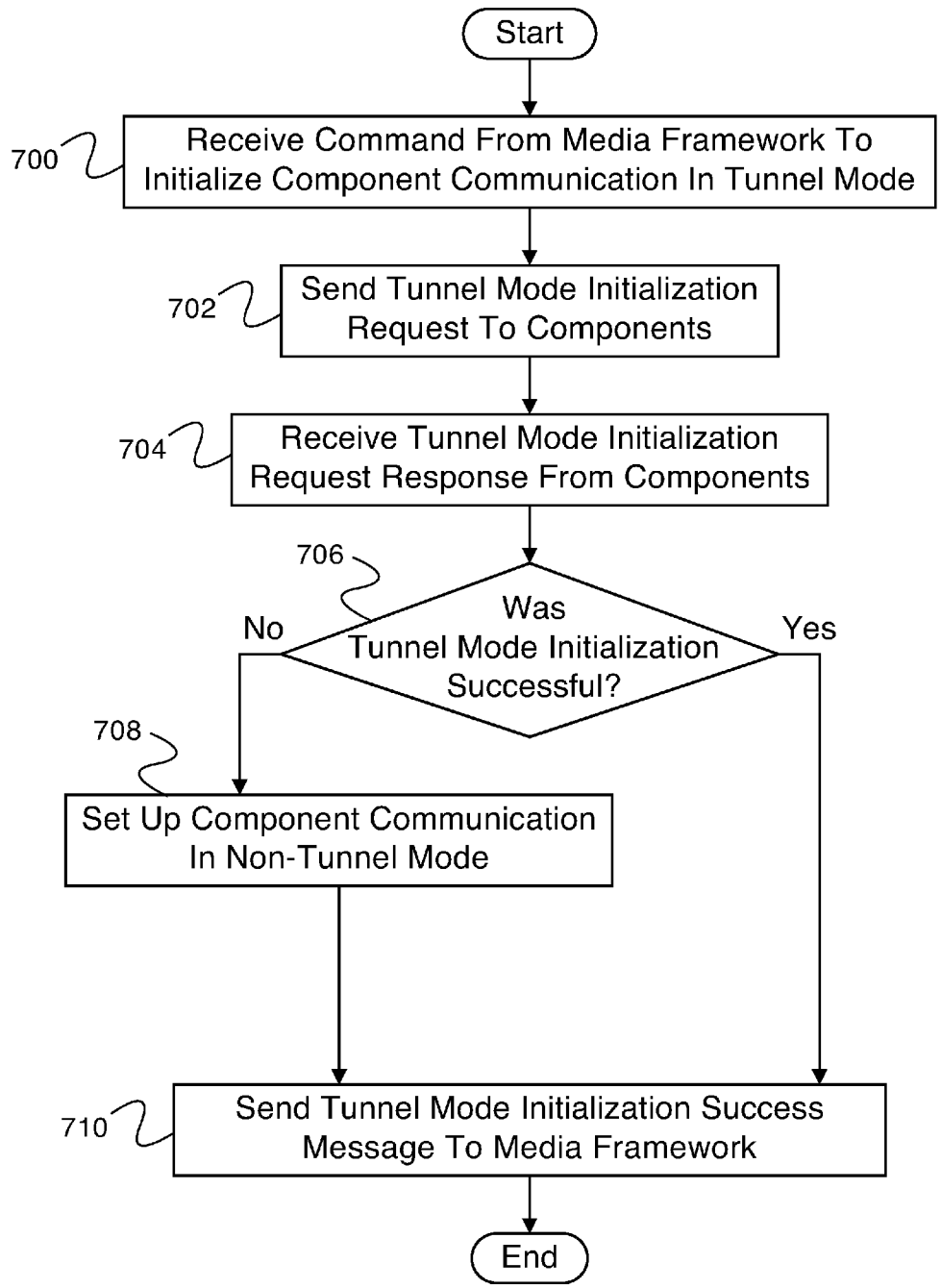
FIG. 7 is a flow diagram illustrating an embodiment of a process for initializing component communication.

FIG. 7 is a flow diagram illustrating an embodiment of a process for initializing component communication. In some embodiments, the process of FIG. 7 is carried out by a non-tunnel mode handler (e.g., non-tunnel mode handler 606 of FIG. 6) initializing communication between media framework components (e.g., non-tunneling media framework component 612 of FIG. 6 and non-tunneling media framework component 614 of FIG. 6). In some embodiments, the process of FIG. 7 is designed to interface media framework components that do not support tunnel mode communication with a media framework that does not support coordination of communication in non-tunnel mode (e.g., simplified media framework 604 of FIG. 6). In the example shown, in 700, a command is received from the media framework to initialize component communication in tunnel mode. In 702, the tunnel mode initialization request is sent to the components. If the components whose communication is being set up comprise tunneling media framework components (e.g., tunneling media framework component 406 of FIG. 4 and tunneling media framework component 410 of FIG. 4), the components will set up tunneling communication and respond that tunnel mode initialization was successful. If either of the components whose communication is being set up comprises a non-tunneling media framework component (e.g., non tunneling media framework component 308 of FIG. 3 or non-tunneling media framework component 310 of FIG. 3), the components will respond that tunnel mode initialization was unsuccessful. In 704, the tunnel mode initialization request response is received by the non-tunnel mode handler. In 706, if the tunnel mode initialization request response indicates that the tunnel mode initialization was successful, control passes to 710. In 710, the non-tunnel mode handler sends a tunnel mode initialization success message to the media framework, and tunnel mode communication has been set up successfully. Note that in this case, non-tunnel mode handler will be removed between components and simplified media framework. In 706, if the tunnel mode initialization request response indicates that tunnel mode initialization was unsuccessful, control passes to 708. In 708, the non-tunnel mode handler sets up component communication in non-tunnel mode. When component communication has been set up in non-tunnel mode, control passes to 710. In 710, the non-tunnel mode handler sends a tunnel mode initialization success message to the media framework. Non-tunnel mode communication has been set up successfully, but the media framework is unaware that the components are communicating in non-tunnel mode rather than in tunnel mode.

Figure 8:
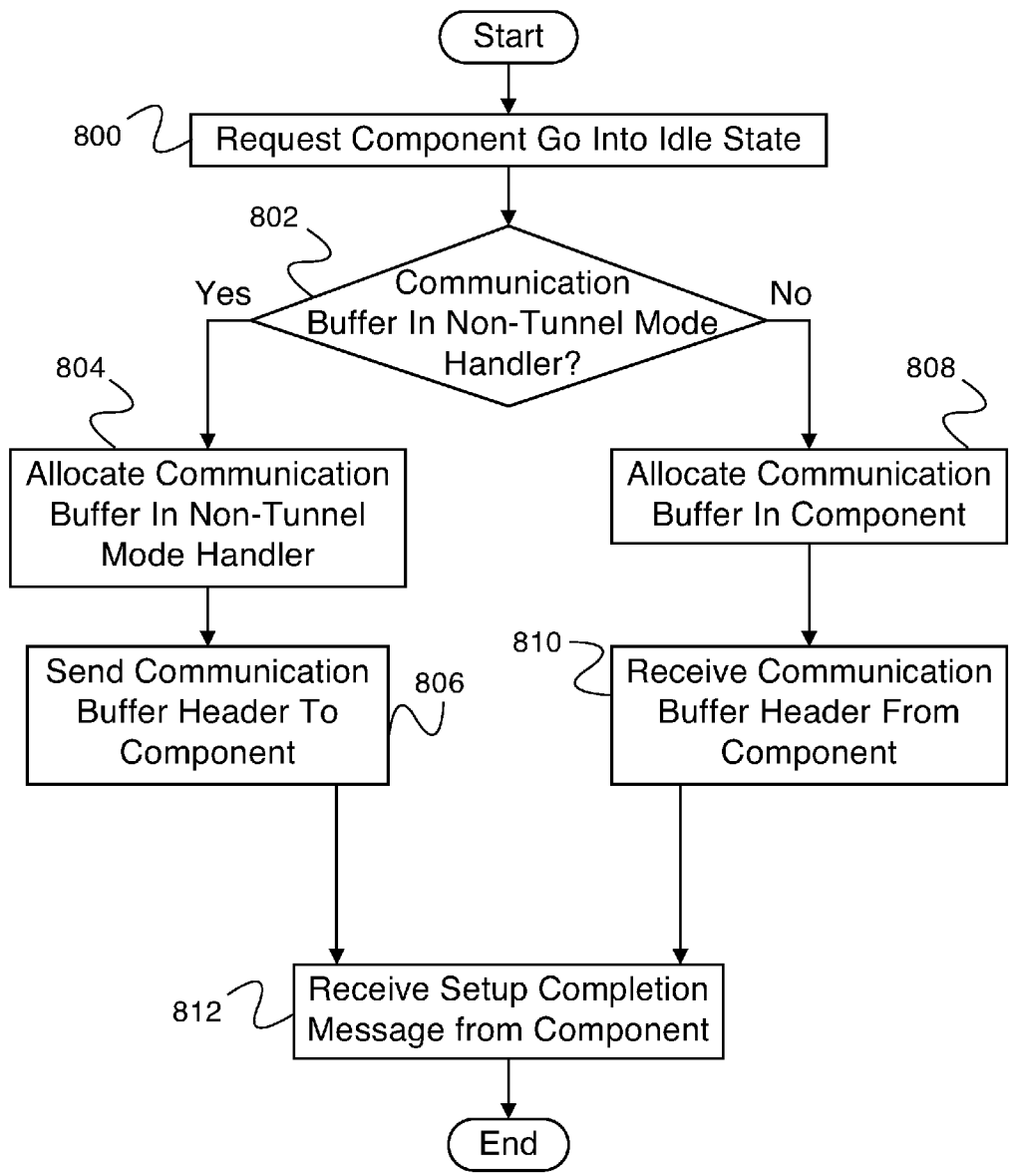
FIG. 8 is a flow diagram illustrating an embodiment of a process for setting up communication in non-tunnel mode.

FIG. 8 is a flow diagram illustrating an embodiment of a process for setting up communication in non-tunnel mode. In some embodiments, the flow diagram of FIG. 8 implements 708 of FIG. 7. In some embodiments, the process of FIG. 8 is carried out by a non-tunnel mode handler (e.g., non-tunnel mode handler 606 of FIG. 6). In the example shown, in 800, the components are requested to go into idle state. When the component has been requested to go into idle state, communication buffers can be set up. In 802, the non-tunnel mode handler decides whether to put the communication buffer in the non-tunnel mode handler. In various embodiments, the non-tunnel mode handler decides whether to put the communication buffer in the non-tunnel mode handler In some embodiments, buffer location is determined by component and non-tunnel mode handler implementations. based on the type of component the non-tunnel mode handler is setting up communication for, based on the way it has set up communication for previous components, randomly, the same way each time, based on a set pattern, or using any other appropriate method to decide where to put the communication buffer. If the non-tunnel mode handler decides the communication buffer should be located in the non-tunnel mode handler, control passes to 804. In 804, the communication buffer is allocated in the non-tunnel mode handler. In 806, the communication buffer header is sent to the component. The component uses the communication buffer header to contact the communication buffer in order to send data to it or receive data from it. Control then passes to 812. In 812, a setup completion message is received from the component, and the process is complete. If the non-tunnel mode handler decides that the communication buffer should not be in the non-tunnel mode handler in 802, control passes to 808. In 808, the communication buffer is allocated in the component. In some embodiments, the non-tunnel mode handler sends the component specifications to use when allocating the communication buffer. In 810, the communication buffer header is received from the component. The non-tunnel mode handler uses the communication buffer header to contact the communication buffer in order to send data to it or receive data from it. Control then passes to 812. In 812, a setup completion message is received from the component, and the process is complete.

Figure 9:
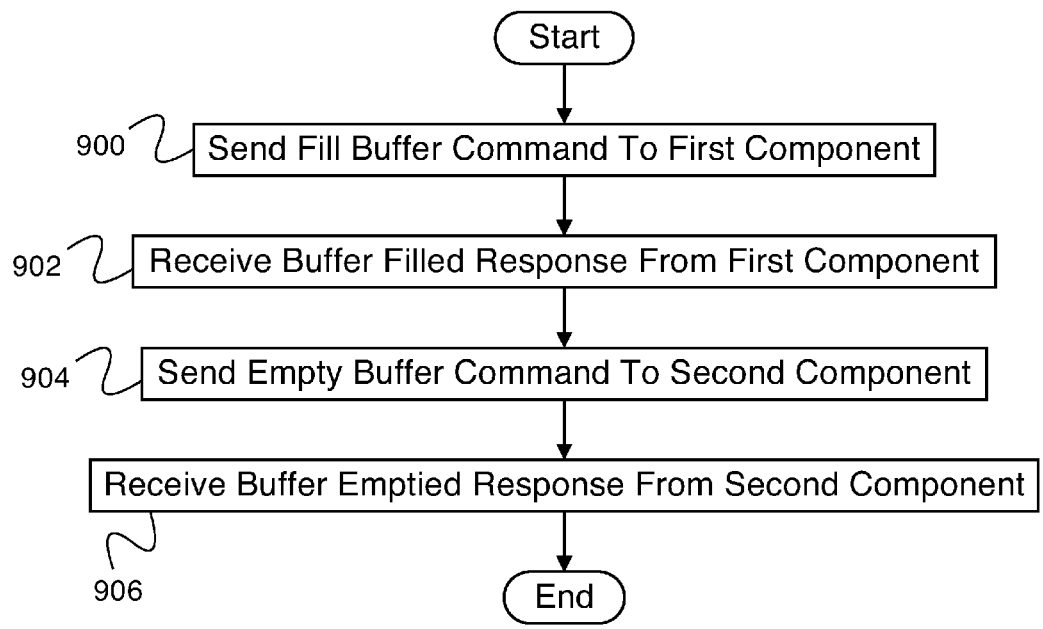
FIG. 9 is a flow diagram illustrating a process for coordinating communication in non-tunnel mode.

FIG. 9 is a flow diagram illustrating a process for coordinating communication in non-tunnel mode. In some embodiments, the process of FIG. 9 is carried out by a non-tunnel mode handler (e.g., non-tunnel mode handler 606 of FIG. 6). In some embodiments, the process of FIG. 9 is used to coordinate communication between two non-tunneling media framework components (e.g., non-tunneling media framework component 612 of FIG. 6 and non-tunneling media framework component 614 of FIG. 6). In the example shown, in 900, a fill buffer command is sent to a first component (e.g., non-tunneling media framework component 612 of FIG. 6). The first component fills the communication buffer with data to transmit. In some embodiments, the first component uses a buffer header (e.g., a buffer header received in 806 of FIG. 8) to locate the communication buffer. In 902, a buffer filled response is received from the first component. In some embodiments, the first component sends the buffer filled response to the non-tunnel mode handler when it has finished filling the communication buffer. In 904, an empty buffer command is sent to a second component (e.g., non-tunneling media framework component 614 of FIG. 6). The second component empties the communication buffer of transmitted data. In some embodiments, the second component uses a buffer header (e.g., a buffer header received in 806 of FIG. 8) to locate the communication buffer. In 906, a buffer emptied response is received from the second component. In some embodiments, the second component sends the buffer emptied response to the non-tunnel mode handler when it has finished emptying the buffer. In some embodiments, if there is more data to transmit, the process is repeated.

Figure 10:
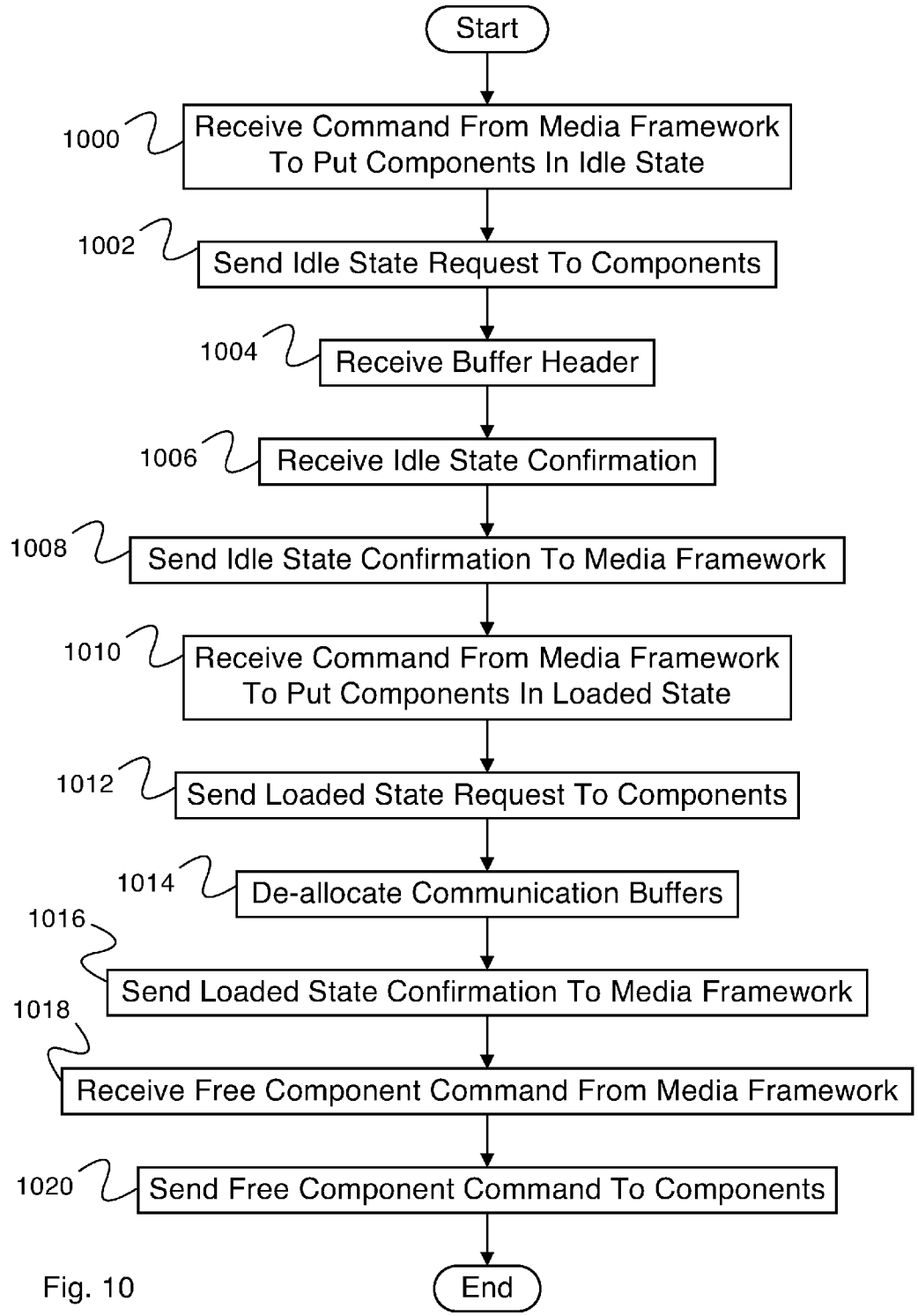
FIG. 10 is a flow diagram illustrating a process for de-initializing non-tunnel mode communication.

FIG. 10 is a flow diagram illustrating a process for de-initializing non-tunnel mode communication. In some embodiments, the process of FIG. 10 is carried out by a non-tunnel mode handler (e.g., non-tunnel mode handler 606 of FIG. 6). In some embodiments, the process of FIG. 10 comprises a process for de-initializing non-tunnel mode communication in response to a request to de-initialize tunnel mode communication from a media framework that does not support non-tunnel mode communication (e.g., simplified media framework 604 of FIG. 6). In the example shown, in 1000, a command to put components in an idle state is received. In some embodiments, the command to put components in an idle state is received from the media framework. In 1002 an idle state request is sent to components. In 1004, a buffer header is received by the non-tunnel mode handler. In 1006, idle state confirmation is received by the non-tunnel mode handler. In some embodiments, when media framework components communicating in non-tunnel mode receive an idle state request, they first release their connection to the communication buffer and then transition to idle state. The media framework component returns the buffer header to the media framework as confirmation that the communication buffer has been released, and then sends an idle state confirmation to the media framework. In the example shown, the non-tunnel mode handler receives the buffer header from the component, but does not forward it to the media framework, as the media framework is not expecting to receive it. In 1008, the idle state confirmation is sent to the media framework. In 1010, a command is received from the media framework to put the components in the loaded state. In some embodiments, changing the components to loaded state allows communication buffers to be de-allocated. In 1012, a loaded state request is sent to the components. In 1014, communication buffers are de-allocated. In some embodiments, de-allocating communication buffers comprises freeing the buffer memory. In 1016, loaded state confirmation is sent to the media framework. In some embodiments, when de-initializing tunnel mode communication, confirmation of the transition to loaded state is required before the media framework proceeds with de-initialization, but confirmation of the transition to loaded state is not required when de-initializing non-tunnel mode communication. The non-tunnel mode handler creates the confirmation message at the appropriate time to cause the media framework to proceed with de-initialization, even though it does not receive a confirmation message from the media framework components. In 1018, a free component command is received from the media framework. In 1020, a free component command is sent to the components. The free component command disposes of the components and frees their memory. In some embodiments, the buffer de-allocation of 1014 happens in free component after 1020 if the buffer is allocated in component.

Figure 11:
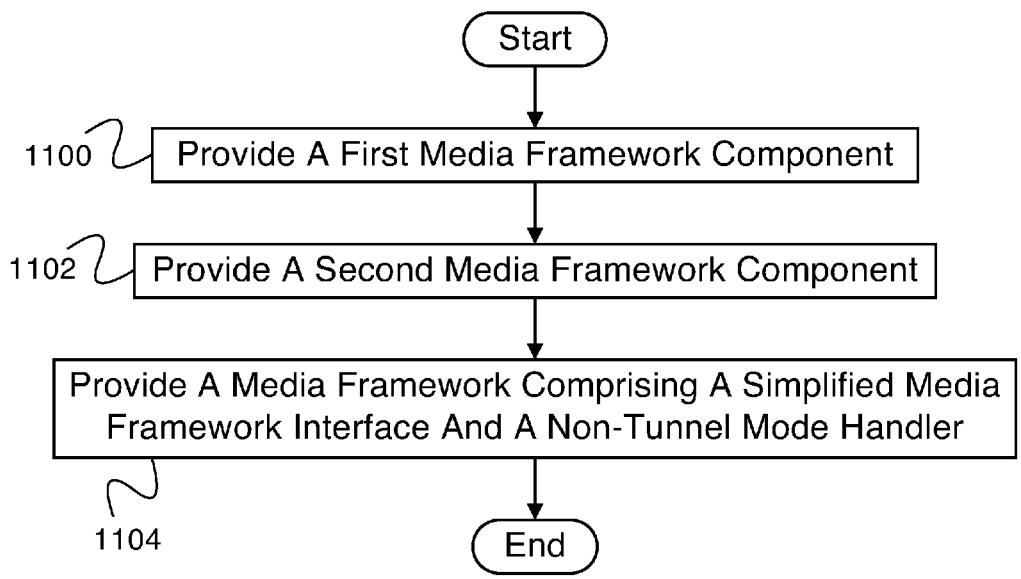
FIG. 11 is a flow diagram illustrating a process for creating a media framework application.

FIG. 11 is a flow diagram illustrating a process for creating a media framework application. In some embodiments, the process of FIG. 11 is used to create media framework application 600 of FIG. 6. In the example shown, in 1100, a first media framework component is provided (e.g., non-tunneling media framework component 612 of FIG. 6 or tunneling media framework component 406 of FIG. 4). In 1102, a second media framework component is provided (e.g., non-tunneling media framework component 614 of FIG. 6 or tunneling media framework component 410 of FIG. 4). In 1104, a media framework comprising a simplified media framework interface (e.g., simplified media framework 604 of FIG. 6) and a non-tunnel mode handler (e.g., non-tunnel mode-handler 606 of FIG. 6) is provided. In some embodiments, the simplified media framework interface handles connectivity between a first port (e.g., port 620 of FIG. 6) and a second port (e.g., port 622 of FIG. 6) in a tunnel mode. The non-tunnel mode handler converts connectivity of a third port (e.g., port 624 of FIG. 6) and a fourth port (e.g., port 626 of FIG. 6) to appear to be in a tunnel mode for the simplified media framework interface. The first port and the second port of the simplified media framework interface are coupled to a fifth port (e.g., port 628 of FIG. 6) and a sixth port (e.g., port 630 of FIG. 6) of the non-tunnel mode handler. The third port of the non-tunnel mode handler is coupled to the first media framework component and the fourth port of the non-tunnel mode handler is coupled to the second media framework component.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system comprising:
a first media framework component;
a second media framework component; and
a media framework comprising:
  a simplified media framework interface, wherein the simplified media framework interface handles connectivity between a first port and a second port in a tunnel mode; and
  a non-tunnel mode handler,
    wherein the non-tunnel mode handler converts connectivity of a third port and a fourth port in a non-tunnel mode to appear to be the tunnel mode for the simplified media framework interface,
    wherein the first port and the second port of the simplified media framework interface is coupled to a fifth port and a sixth port of the non-tunnel mode handler,
    wherein one of the third and fourth ports of the non-tunnel mode handler intercepts non-tunnel mode communications between the first media framework component and the second media framework component intended for the simplified media framework interface and outputs a translation of the non-tunnel mode communications via the other of the third and fourth ports in non-tunnel mode, and
    wherein the third port of the non-tunnel mode handler is coupled to the first media framework component and the fourth port of the non-tunnel mode handler is coupled to the second media framework component.
2. A system as in claim 1, wherein the first media framework component communicates with a media input device.

3. A system as in claim 2, wherein the media input device comprises one or more of the following: a still camera, a video camera, and a microphone.

4. A system as in claim 2, wherein the media input device receives a streaming data input that arrives via one or more of the following: an Internet connection, a WiFi network connection, a Bluetooth connection, or a 3G/4G cellular network connection.

5. A system as in claim 1, wherein the second media framework component communicates with a media output device.

6. A system as in claim 5, wherein the media output device comprises one or more of the following: a video display device and a speaker.

7. A system as in claim 1, wherein the first media framework component, the second media framework component, and the media framework are part of a system for processing a data file of video or audio data.

8. A system as in claim 7, wherein the processing of the data file provides output to present to a user the processed data file as video using a video display or audio using a speaker.

9. A system as in claim 1, wherein a communication buffer is allocated in the non-tunnel mode handler.

10. A system as in claim 9, wherein a communication buffer header is transmitted to the first media framework component or the second media framework component so that the communication buffer header can be used for sending or receiving data by the first media framework component or the second media framework component.

11. A system as in claim 1, wherein a communication buffer is allocated in the first media framework component or the second media framework component.

12. A system as in claim 11, wherein the non-tunnel mode handler sends a buffer allocation specification to the first media framework component or the second media framework component.

13. A system as in claim 11, wherein a communication buffer header is transmitted from the first media framework component or the second media framework component so that the communication buffer header can be used for sending or receiving data by the first media framework component or the second media framework component.

14. A system as in claim 1, wherein a first media framework component or a second media framework component determines whether tunnel mode initialization was successful.

15. A system as in claim 14, wherein in the event that tunnel mode initialization was not successful, setting up the communication between the first media framework component and the second media framework component in non-tunnel mode.

16. A system as in claim 15, wherein the non-tunnel mode handler indicates to the simplified media framework that tunnel mode initialization was successful.

17. A system as in claim 1, wherein in the event that the one of the third and fourth ports of the non-tunnel mode handler intercepts the non-tunnel mode communications between the first media framework component and the second media framework component, the non-tunnel mode handler notifies the simplified media framework interface that the first media framework component and the second media framework component are communicating in tunnel mode.

18. A system as in claim 1, wherein the simplified media framework interface is separate from the non-tunnel mode handler.

19. A method comprising:
providing a first media framework component;
providing a second media framework component; and
providing a media framework comprising:
    a simplified media framework interface, wherein the simplified media framework interface handles connectivity between a first port and a second port in a tunnel mode; and
    a non-tunnel mode handler,
        wherein the non-tunnel mode handler converts connectivity of a third port and a fourth port in a non-tunnel mode to appear to be the tunnel mode for the simplified media framework interface,
        wherein the first port and the second port of the simplified media framework interface is coupled to a fifth port and a sixth port of the non-tunnel mode handler,
        wherein one of the third and fourth ports of the non-tunnel mode handler intercepts non-tunnel mode communications between the first media framework component and the second media framework component intended for the simplified media framework interface and outputs a translation of the non-tunnel mode communications via the other of the third and fourth ports in non-tunnel mode, and
        wherein the third port of the non-tunnel mode handler is coupled to the first media framework component and the fourth port of the non-tunnel mode handler is coupled to the second media framework component.

20. A computer program product, the computer program product being embodied in a computer readable storage medium and comprising computer instructions for:
providing a first media framework component;
providing a second media framework component; and
providing a media framework comprising:
    a simplified media framework interface, wherein the simplified media framework interface handles connectivity between a first port and a second port in a tunnel mode; and
    a non-tunnel mode handler,
        wherein the non-tunnel mode handler converts connectivity of a third port and a fourth port in a non-tunnel mode to appear to be the tunnel mode for the simplified media framework interface,
        wherein the first port and the second port of the simplified media framework interface is coupled to a fifth port and a sixth port of the non-tunnel mode handler,
        wherein one of the third and fourth ports of the non-tunnel mode handler intercepts non-tunnel mode communications between the first media framework component and the second media framework component intended for the simplified media framework interface and outputs a translation of the non-tunnel mode communications via the other of the third and fourth ports in non-tunnel mode, and
        wherein the third port of the non-tunnel mode handler is coupled to the first media framework component and the fourth port of the non-tunnel mode handler is coupled to the second media framework component.

\* \* \* \* \*